July 20, 1965  R. E. HARDER  3,195,865
INTERFACIAL SURFACE GENERATOR
Filed Sept. 9, 1960  3 Sheets-Sheet 1

INVENTOR.
Richard E. Harder
BY
AGENT

INVENTOR.
Richard E. Harder
BY Robert B. Ingraham
AGENT

July 20, 1965 R. E. HARDER 3,195,865
INTERFACIAL SURFACE GENERATOR
Filed Sept. 9, 1960 3 Sheets-Sheet 3

INVENTOR.
Richard E. Harder
BY
AGENT

United States Patent Office 3,195,865
Patented July 20, 1965

3,195,865
INTERFACIAL SURFACE GENERATOR
Richard E. Harder, Williamsburg, Va., assignor to The Dow Chemical Company, Midland, Mich., a corporation of Delaware
Filed Sept. 9, 1960, Ser. No. 54,933
16 Claims. (Cl. 259—4)

This invention relates to an interfacial surface generator and a method of generating interfacial surfaces and more particularly relates to a method and apparatus for generating interfacial surfaces in a fluid mass by dividing, repositioning, and recombining a stream of the fluid mass flowing in a conduit.

Various methods, machines and devices have been employed for mixing liquids, fluids, and finely divided solid particles. Most of these are based upon the use of a mechanically driven agitator or stirrer operating in the material to be mixed. It is assumed that the repetitive shear thereby induced will eventually produce a relatively homogeneous blend. Methods employing shear, particularly when applied to highly viscous systems, are notably inefficient. In such cases, a large quantity of power is required to drive the agitating or mixing members, much of the power is unavoidably converted into heat in the mixture.

The energy transformed into heat usually contributes little, if anything, to the mixing. In many cases the heat must be removed to avoid undesirable overheating. Such heat is almost always wasted, especially when conventional cooling means are used to absorb it.

An apparatus employed in the manipulation of viscous liquids is generally large, massive, and costly. Frequently, the rheological characteristics of highly viscous materials are such that in order to obtain mixing, high rates of shear must be employed, therefore, necessitating employing close mechanical clearances. Oftentimes viscous materials are mixed on rolls, mill, or in rotary pumps, and the like. Frequently, it is advantageous that the liquids be reduced in viscosity by diluting with a solvent, mixing at a reduced viscosity, and subsequently removing the solvent by distillation or other evaporative means.

Viscous liquids and similar fluids have been mixed by forcing them to flow through passageways designed to cause turbulence in the flowing stream manifest by a displacement of the stream elements as they are separated and recombined during the flow. Generally, equipment of this nature presents a relatively high back pressure to the forwarding means, e.g., pump. The efficiency of mixing in any particular apparatus of this type will be proportional to the throughput. At low flow rates, a relatively small amount of mixing will occur. However, as the flow rate is increased and the amount of turbulence is thereby increased, a more homogeneous product will result.

Great difficulty has been encountered in heating and cooling viscous liquids. In many cases thermal conduction is relied upon rather than bringing the various portions of liquid into contact with a heat-exchange surface, as by agitating the liquid while in contact with a cooling surface. Adequate mixing in the heat-exchange section is required to increase over-all heat transfer.

Mixing devices have been devised which employ the principle of dividing a stream, expanding its cross sectional dimensions in a plane noncoplanar with the plane of division, and recombining the divided parts in overlapping relationship. When various liquids or other materials having a tendency to adhere to the walls and baffle surfaces of such a device are employed, there is a strong tendency for the material which is centrally disposed in the conduit to progress through the device at a more rapid rate. Consequently, the discharge from such a device oftentimes shows a greater degree of mixing in the central portion of the stream than is obtained adjacent the walls.

In view of the difficulties attendant upon the use of the commercially available methods and devices in the mixing art, it is manifest that it would be advantageous if there were available an apparatus and method having no moving parts which would permit thorough mixing of a fluid and have an efficiency substantially independent of the rate of throughput and substantially eliminate the tendency of an appreciable fluid layer to remain near the walls of the conduit.

It would be further advantageous if such an apparatus and method would present a relatively low back pressure to the forwarding means.

It would, also, be beneficial and advantageous if the pressure drop across such a mixing device were small relative to conventional turbulent mixing sections and readily produced by conventional production techniques.

It would be advantageous if such a method and apparatus would permit the efficient transfer of heat from the viscous liquid to the walls of a heat exchanger.

These and other benefits and advantages may be obtained according to the method of the invention by generating internal surfaces within a flowing mass without significantly rotating the flow lamina of said mass; the steps of the method comprising: (a) dividing the flowing mass into at least four parts by dividing means, (b) decreasing the cross-sectional dimension of said parts in the plane of said dividing means, and (c) increasing the dimension of said parts as in a plane noncoplanar with the plane of said dividing means, and (d) recombining said parts in overlapping relationship; wherein the more centrally located parts are disposed toward the periphery of the conduit, and the peripheral parts are positioned more centrally. In some instances it may be desirable to repeat the foregoing combination of steps on the so mixed stream.

The device herein referred to as a baffle structure adapted to be employed in a flowing stream to divide and recombine the flowing mass stream in accordance with the invention comprises: a body member having a first end and a second end; said body defining at least four channels communicating with said first and second ends and having stream dividers at each of said ends; each of said channels having a first opening and a second opening; each of said openings having a generally elongated cross-sectional configuration in a plane normal to the longitudinal axis of said stream; the major axes of said generally elongated cross-sectional configurations of said first and said second openings being noncoplanar; said channels being so constructed and arranged that rotation of the flow lamina of said stream is less than the angular displacement between a said stream divider at said first end and a stream divider at said second end.

Further features and advantages of the invention will be more apparent in the following description and specification when taken in connection with the accompanying drawing, wherein:

FIGURE 8 is a cutaway view of a simple mixer employing four baffle structures in accordance with the invention, two of the baffle structures being mirror image forms of the other two.

Figure 11:
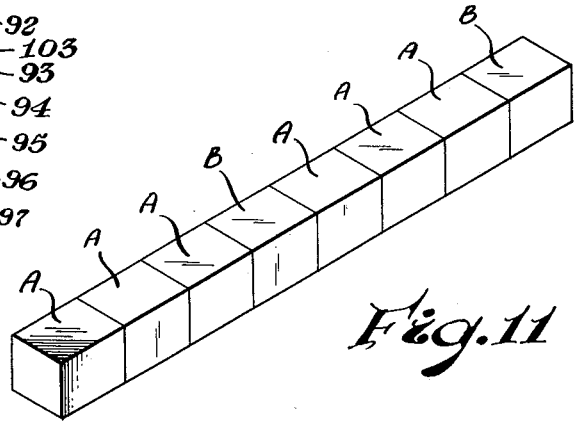

FIGURE 11 schematically depicts an arrangement of baffles 9 and 10 which may be employed within a cylindrical conduit.

Figure 12:
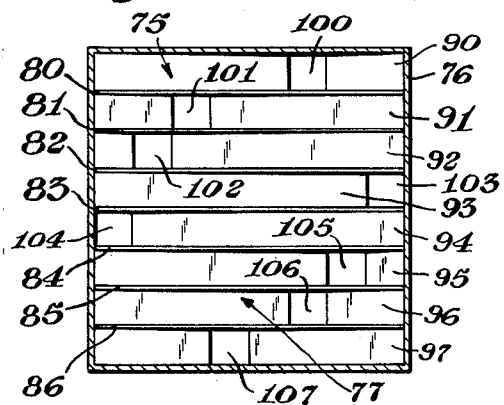
Figure 13:
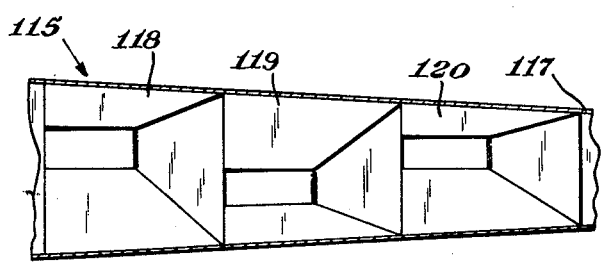

FIGURE 12 depicts a front view of a baffle adapted to be placed in a square conduit wherein the stream will be divided into eight parts; and FIGURE 13 shows a view of tapered sections positioned in a tapering conduit. In the several figures like numerals designate like parts.

Figure 1:
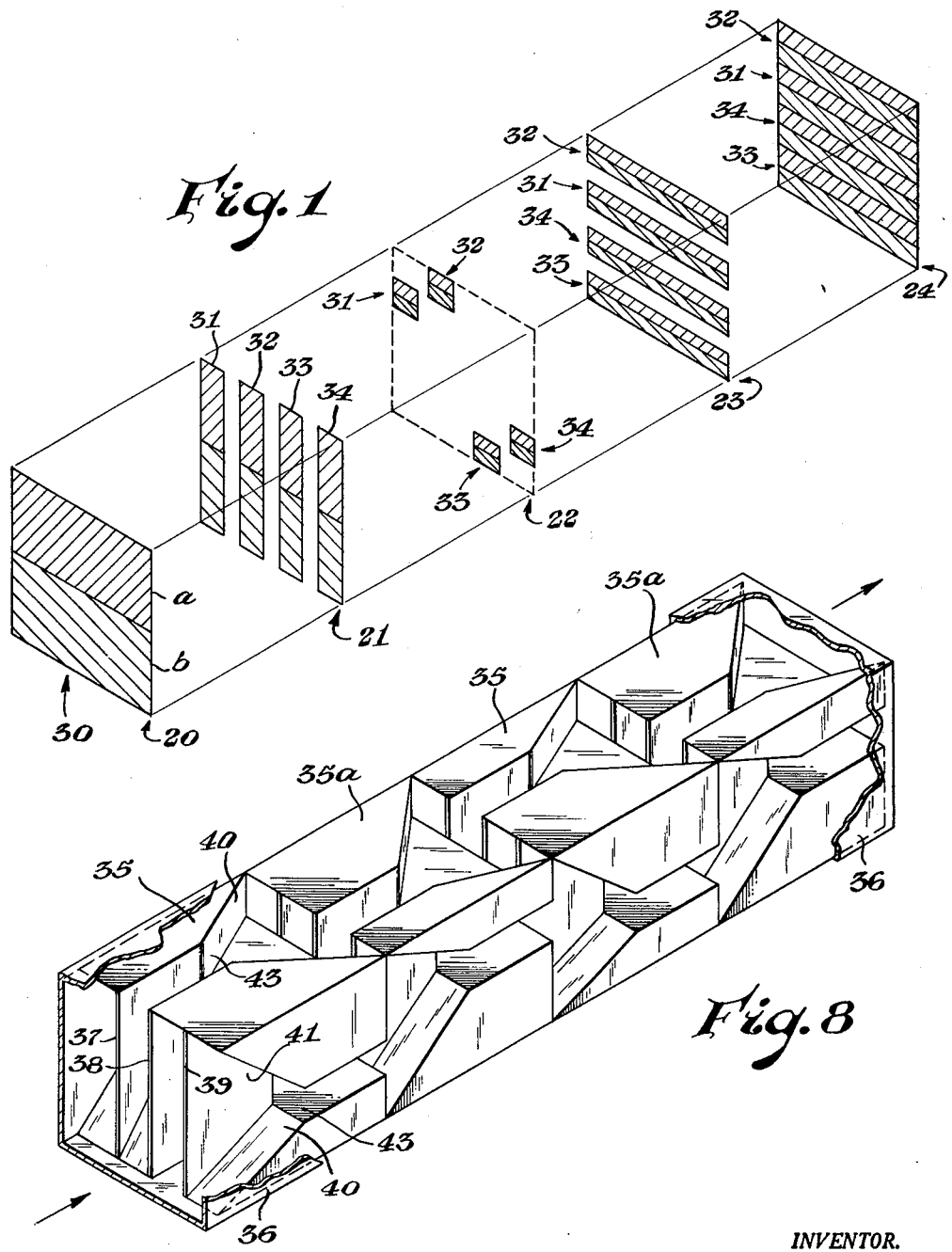
FIGURE 1 is a schematic representation of the operations of division, expansion, and recombination of a fluid stream as carried out in accordance with the method of the invention and illustrating a modification thereof.

In FIGURE 1 are illustrated the various operations that are performed in mixing a stream by passing it over or through a baffle structure in accordance with the invention. In this representation, a main stream is composed of two smaller streams. Section 20 represents a stream 30 having two layers designated by the letters *a* and *b*. Initially, in section 21 the main stream 30 is divided into four parts designated as 31, 32, 33, and 34. In section 23 the stream parts 31, 32, 33, and 34 are widened in a direction noncoplanar with the plane of division, and the centrally positioned stream parts 32 and 33 are diverted toward a periphery of the conduit while stream parts 31 and 34 are positioned more centrally. In section 24 the stream parts are then recombined in overlapping relationship. A stream, as shown in section 20, after passing through the single four channel baffle structure in accordance with the invention, is changed from two layers to eight layers as shown in section 24.

Alternately, in one embodiment of the invention, the cross-sectional area of the streams 31, 32, 33 and 34, as shown in section 22, is reduced and each resulting stream directed toward the periphery of the conduit prior to broadening the stream in a plane noncoplanar with the plane of division. The dividing and recombining operations, as illustrated in FIGURE 1, are done without significant rotation of the flow lamina of the stream.

Figure 2:
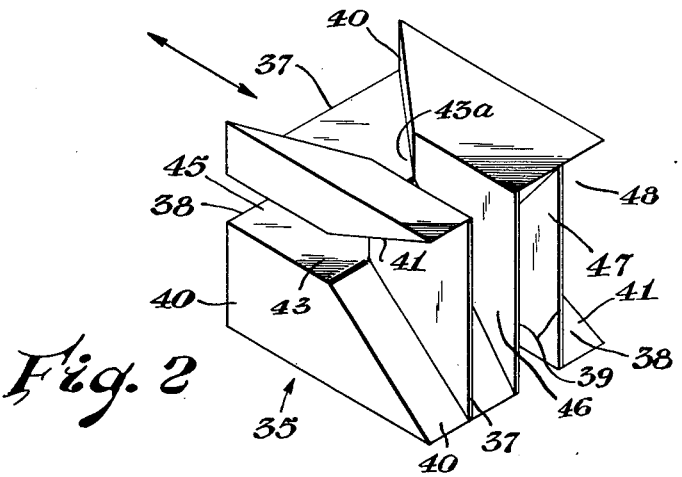
FIGURE 2 is an isometric view of a form of a baffle structure of the invention.
Figure 5:
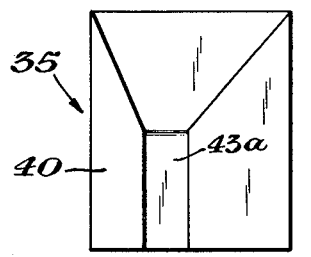
FIGURES 4 to 7 show the possible side views of the baffle of FIGURE 3.
Figure 4:
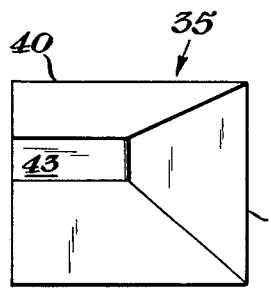

In FIGURE 2 there is illustrated a detailed isometric view of the baffle 35 arbitrarily designated as right-handed. The baffle comprises a body 40 having defined therein four channels, 45, 46, 47, and 48. The channels are formed by the deflecting surfaces in combination with the dividing means. Typically one-half of the channel 45 is formed by the dividing means 37 in combination with deflecting surfaces 40 and 41. The opposite end half of the channel 45 is formed by the dividing means 37 and 38 positioned on the opposite end of the body portion 40 from the first half of the channel 45 and the deflecting surface (not shown) is equivalent to the deflecting surface intersecting the dividing means 37 and 38 at near end of the body portion 40 in FIGURE 2. Similarly, the channels 46, 47 and 48 are formed by corresponding deflecting surfaces and dividing means. A plane of symmetry exists coplanar with the restrictions 43 and 43a. If the baffle 35 is divided on this plane of symmetry and rotated 180 degrees on an axis parallel to the dividing means 38 of the front portion and rotated 90 degrees in a clockwise direction, the two halves are identical.

Figure 3:
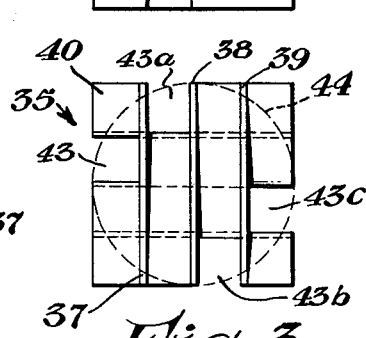
FIGURE 3 is a front view of the baffle of FIGURE 2.
Figure 6:
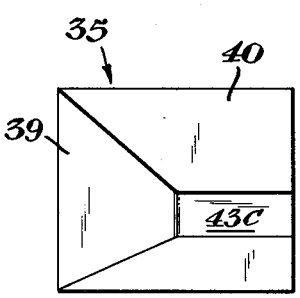
Figure 7:
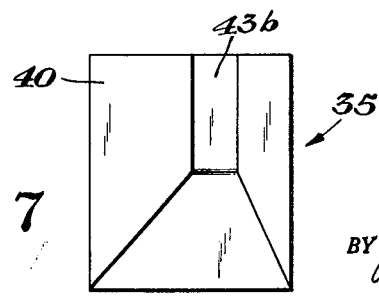

FIGURE 3 illustrates a front view of the baffle of FIGURE 2, showing the restricted portion of the channels 43, 43a, 43b, and 43c. It will be observed that there exists a plane of mirror symmetry coplanar with the dividing means 38 and 2 planes of mirror symmetry which lie in the diagonals of the front view. FIGURES 4, 5, 6, and 7 are presented to further clarify the configuration of the baffle 35. Each figure represents a view of the side of the baffle closest to the appropriate figure. To obtain this view, a baffle in FIGURE 3 is rotated about an axis corresponding to the periphery of the baffle closest to the side view presented. Thus, the front portion of the side view of the baffle 35 in each illustration is adjacent to FIGURE 3.

The FIGURE 8 is a cutaway view of a simple embodiment of the four-stage mixer in accordance with the invention wherein four baffles, indicated by the numbers 35 and 35a, are employed. The baffles 35 and 35a are positioned in a housing or conduit 36. The baffles 35 and 35a are formed as mirror images of each other, that is, one may be designated as a right-handed baffle and the other as a left-handed baffle. The arrows indicate a direction in which the stream to be mixed may flow although the flow may be in the opposite direction if desired.

In FIGURE 8 the baffles 35 and 35a are not shown in a mirror image relationship, but baffles 35a are rotated 90 degrees in a clock-wise direction from that relationship. The baffles 35 are provided with dividing members 37, 38 and 39 and deflecting surfaces 40 and 41. The deflecting surfaces 40 and 41 together with dividing members 37, form the restriction generally indicated by the reference number 43.

Figure 9:
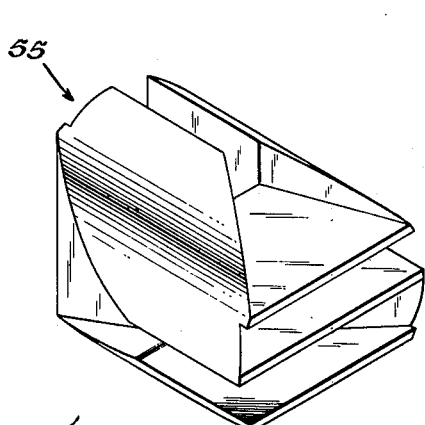
FIGURE 9 illustrates an embodiment of the invention adapted to be employed in a circular conduit.

In FIGURE 9 there is illustrated an alternate embodiment of the baffle 35 in accordance with the invention, generally designated by the reference numeral 55. Generally, this baffle is similar to the baffle of FIGURES 2, 3, 4, 5, 6, and 7 with the alteration that it is adapted to be inserted in a conduit of circular cross-section. A baffle of this nature may be readily generated from the baffle of FIGURE 3 and 4 by employing as the periphery the inscribed circle which may be drawn within the generally square periphery, as shown by the dotted line 44 in FIGURE 4.

Figure 10:
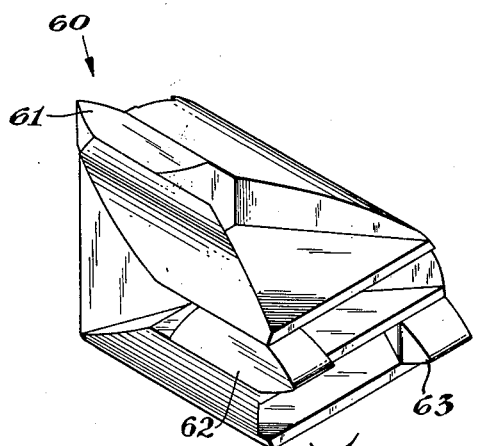
FIGURE 10 illustrates an alternate embodiment of the baffle of FIGURE 9.

In FIGURE 10 is illustrated a baffle generally indicated by the reference number 60, which is also adapted to be incorporated in a conduit of circular cross-section. The baffle 60 is a mirror image of the baffle 55 of FIGURE 9 to which there has been added deflection wedges 61, 62, 63 and a deflection wedge diagonally opposed to wedge 61 not shown. The deflection wedges 61, 62, 63 and one not shown are positioned in such a manner that the wedges are diametrically opposed in adjacent central channels. The cross-sectional configuration of one end of each channel is adjacent the periphery of the baffle and the opposite end of said cross-sectional configuration is remote from the periphery.

In FIGURE 11 there is a schematic representation of the placement, in a conduit, of the baffles with and without deflection wedges. The blocks A designate baffles of the general type 35, 35a, and 55 while the blocks designated B denote baffles employing deflection wedges such as the wedges 61, 62, and 63 of baffle 60.

A front view of an alternate embodiment of the invention is illustrated in FIGURE 12, wherein there is a baffle generally indicated by the reference number 75, disposed within the conduit 76. The baffle 75 is comprised of a body portion 77 and a plurality of dividing means 80, 81, 82, 83, 84, 85 and 86. The baffle 75 has 8 channels: 90, 91, 92, 93, 94, 95, 96, and 97. The eight channels taper toward a position intermediate to the ends of the baffle 75 to form the restrictions 100, 101, 102, 103, 104, 105, 106 and 107. At the opposite end of the baffle 75 (not shown) the channel expands to substantially the full width of the conduit in a plane at right angles with the major axis of the illustrated channel openings 90, 91, 92, 93, 94, 95, 96, and 97. By way of illustration, the opposite end of channel 90 would have a configuration similar to channels 90 and 94 with the restrictions 103 and 104 corresponding to the restriction 100.

In FIGURE 13 is shown a cutaway plan view of a tapered embodiment of an interfacial surface generator, generally indicated by the reference number 115, comprising a tapered conduit 117, two tapered left-hand baffles 118 and 120, and a tapered right-hand baffle, 119. Three baffles, 116, 117, and 118 of diminishing cross-section are positioned within a tapered housing 120.

The operation of all or any of the previously illustrated embodiments of the invention and the method thereof is substantially in accordance with the flow patterns illustrated in FIGURE 1. The fundamental principle of the operation is the initial division of the stream into four or more parts, elongating the cross-sectional configuration of these parts in a direction noncoplanar with the plane of division, repositioning the innermost streams toward the periphery of the conduit and the peripheral parts toward the center of the conduit; and recombining in an overlapping relationship without rotating the flow laminae from their original plane.

The number of baffles or stages employed in the interfacial surface generator of the invention may be varied to give the required performance for any specific mixing problem. In a mixer of $n$ baffles, each having four channels, the number of layers and the interfacial area is increased proportional to about $2^{2n+1}$ if a feed stream of two or more layers is utilized. The distance between the interfaces is decreased by a factor of about $2^{-(2n+1)}$ with two or more layers in the feed stream.

In some instances wherein the fluid being passed through the apparatus of the invention exhibits a tendency to be held to the peripheral walls of the conduit containing the baffles, particularly when viscid liquids are employed, a tendency for incomplete blending of the portion adjacent to these walls may be observed. Such a phenomenon appears to depend on viscous drag exerted on the fluid by the wall and on the apparent viscosity and the rheological properties of the fluid itself (i.e., dilatant, thixotropic and Newtonian). Advantageously, an auxiliary baffle, as depicted in FIGURE 10, may be employed to provide uniform mixing or surface generation throughout the entire stream. When the baffle is positioned in the channel the wedges or deflecting members serve to deflect the oncoming fluid into adjacent channels which discharge into another quadrant. Thus, the external flow lamina is constantly being directed toward the center of the stream.

Advantageously, the apparatus may be constructed from any of a wide variety of materials including metal, wood, plastic, concrete, and the like or equivalent substances. The choice is predicated only upon the particular conditions which will be encountered in the situation for which the apparatus is designed.

A mixer comprising ten baffles substantially similar to that illustrated in FIGURE 9, having a diameter of 2½ inches and a length of 3 inches was placed in a section of glass pipe, which was a sliding fit for the baffle. A highly viscous stream of an aqueous saline solution of an acrylonitrile copolymer and a red pigmented stream of a similar copolymer are pumped into one end of the mixing section at a total rate of about 100 pounds per hour. A substantially uniform pigmented polymer solution was collected at the exit end of the mixer. The color of the mixed polymer solution was equivalent to that obtained by conventional mixing methods. One pass through the ten stage or baffle mixer is the equivalent of transforming the original two layer stream into a stream of about $2.5 \times 10^6$ layers.

By way of further illustration, a mixing section in accordance with the invention was installed immediately upstream from the spin head in an assembly for spinning filaments from an aqueous saline solution of polyacrylonitrile. The purpose of the mixing section was to provide a spinning solution of uniform temperature. The mixing section comprised a section of pipe about 3⅝ inches inside diameter, containing eight baffles about 3⅝ inches outside diameter and 3½ inches in length. The baffles were of the four channel variety shown in FIGURE 9. About 1,400 pounds per hour of spinning solution, having a viscosity of about 2,000 poise was pumped through the mixing section with a total pressure drop across the mixing section of about 29 pounds per square inch. Inclusion of the mixing section considerably improved the uniformity of the filaments prepared by the assembly.

For the sake of simplicity and clarity, the present invention is described in terms of its mixing or surface generating function. It is readily applied to any flowing stream, is suitable for heat transfer applications such as the heating and cooling of flowable substances, and is applied with particular advantage to viscous liquids.

In cases where a plurality of streams are being blended to a greater or a lesser degree, one or more side streams may be introduced along the side of a mixer such as is illustrated in FIGURE 8. Thus, a plurality of streams may be intimately blended by passing through the entire length of the mixer while one or more other streams are blended to a lesser degree by introducing them downstream from the entrance of the main stream or streams into the mixer in such a manner that the side stream or streams pass through a fewer number of stages of division and recombination. In such a manner, multicolor confectionaries may be prepared, and similar layering operations accomplished with ease.

The apparatus and method of the invention is also adaptable to carrying out chemical reactions wherein controlled rates of mixing may be obtained in conjunction with high heat transfer. By the addition of reactants at suitable points along a mixer (e.g., as depicted in FIGURE 2) sequential additions may be made at appropriate stages of the reaction or reactions occurring within the mixer.

The apparatus and method of the invention may be applied to streams of gases and of particulate solids in addition to liquid streams. Diverse gases may be mixed readily at low linear velocities and in the absence of substantial turbulence, thus permitting quiet operation and a minimum of back pressure across the mixer. In gaseous reactions controlled low velocity mixing may be employed to control reaction rate.

Particulate solids are readily blended with the apparatus and method of the invention. Frequently, it is beneficial to employ tapering mixing sections, such as those illustrated in FIGURE 13 for streams of particulate solids. Tapered baffles may be positioned in the lower section of a hopper or bin to assure blending of the discharge therefrom. Alternately, feeding may be done from the smaller end of a tapered mixing section and the outflow blended and discharged over a relatively larger area. Generally, it is advantageous to employ a mixer mounted in such a manner that flow of the particulate stream or streams is maintained by gravity. However, surface generators or mixers in accordance with the invention, when mounted in any position, readily may be employed to mix diverse gaseous suspensions of solids or liquids, or solids and liquids entrained in a gaseous stream. In a similar manner streams comprised of solids or gases entrained in liquid may be blended with equal facility.

As is apparent, the apparatus and method are susceptible of being embodied with various alterations and modifications from that which has been described in the preceding description and specification. Therefore, it is to be fully understood that all of the foregoing is merely intended to be illustrative and is not to be construed or interpreted as being restrictive or otherwise limiting of the present invention, excepting as it is set forth and defined in the hereto appended claims.

What is claimed is:

1. A baffle adapted to be disposed in a conduit to divide and recombine a flowing mass; said baffle comprising a body having a first end and a second end; said body defining at least four channels communicating with said first and second ends and having stream dividing means at said ends; each of said channels having a first opening and a second opening; each of said openings having a generally elongated cross-sectional configuration in a plane normal to the longitudinal axis of said conduit; the major axes of said generally elongated cross-sectional configuration of said first and said second openings being noncoplanar; said channels being so constructed and arranged that rotation of the flow lamina of said stream is less than the angular displacement between said stream dividing means at said first end and said stream dividing means at said second end.

2. The device of claim 1, wherein said body defines four channels.

3. The device of claim 2, wherein channels having centrally disposed first openings have oppositely peripherally disposed second openings.

4. The device of claim 2, wherein at least one side of all channels is adjacent to the periphery of said body.

5. The device of claim 2, wherein one side of all channels is contiguous with the periphery of said baffle.

6. The device of claim 2, wherein the cross-sectional area of said channels decreases toward a plane normal to said longitudinal axis between said first and second ends.

7. The device of claim 6, wherein the cross-sectional area of said channels in a plane normal to the longitudinal axis is generally proportional to $1/d$ wherein $d$ is the distance along said axis from the nearest end.

8. A baffle adapted to be disposed in a conduit to divide and recombine a flowing mass; said baffle comprising a body having a first end and a second end; said body defining four channels communicating with said first end and said second end and having stream dividing means at said ends; each of said channels having a first opening and a second opening; each of said openings having a generally elongated cross-sectional configuration in a plane normal to the longitudinal axis of said conduit; the major axes of said generally elongated cross-sectional configurations of said first and second openings being noncoplanar; the cross-sectional configuration of said channels in a plane normal to the longitudinal axis of said conduit decreasing toward a plane between said first and second ends; all channels having at least one side adjacent the periphery of said body; channels having centrally disposed first openings having peripherally disposed second openings and channels having peripherally disposed first openings having centrally disposed second openings.

9. The baffle of claim 8, wherein said major axes of said generally elongated cross-sectional configurations are disposed generally at right angles to each other.

10. The baffle of claim 9, wherein said channels have a substantially rectangular cross section.

11. A device adapted to divide and recombine a stream comprising: a conduit having means therein defining at least one baffle; said baffle comprising a body having a first end and a second end; said body defining at least four channels communicating with said first and second ends and having stream dividing means at said ends; each of said channels having a first opening and a second opening; each of said openings having a generally elongated cross-sectional configuration in a plane normal to the longitudinal axis of said conduit; the major axes of said generally elongated cross-sectional configurations of said first and said second openings being noncoplanar; said channels being so constructed and arranged that rotation of the flow lamina of said stream is less than the angular displacement between said stream dividing means at said first end and said stream dividing means at said second end.

12. The device of claim 11 having a plurality of said baffles disposed in said conduit.

13. A method of generating internal surfaces within a flowing mass within a conduit without significantly rotating the flow lamina of said mass; the steps of the method comprising: (a) dividing the flowing mass into at least four parts by dividing means, (b) decreasing the cross-sectional dimension of said parts in the plane of said dividing means, (c) increasing the dimension of said parts as in a plane noncoplanar with the plane of said dividing means, and (d) recombining said parts in overlapping relationship; wherein the more centrally located parts are disposed toward the periphery of the conduit, and the peripheral parts are positioned more centrally.

14. A method of generating internal surfaces within a flowing mass within a conduit without significantly rotating the flow lamina of said mass; the steps of the method comprising: (a) dividing the flowing mass into at least four parts by dividing means, (b) decreasing the cross-sectional dimension of said parts in the plane of said dividing means, (c) increasing the dimension of said parts in a plane generally about 90° from the plane of said dividing means, and (d) recombining said parts in overlapping relationship; wherein the more centrally located parts are disposed toward the periphery of the conduit, and the peripheral parts are positioned more centrally.

15. A method of generating internal surfaces within a flowing mass within a conduit without significantly rotating the flow lamina of said mass; the steps of the method comprising: (a) dividing the flowing mass into at least four parts by generally planar dividing means, (b) decreasing the dimension of the cross-sectional area of said parts in the plane of said dividing means, (c) increasing the cross-section of area of said parts as in a plane generally about 90° from the plane of said dividing means, and (d) recombining said parts in overlapping relationship; wherein the more centrally located parts are disposed toward the periphery of the conduit, and the peripheral parts are positioned more centrally.

16. The method of claim 13, wherein said flowing stream is a viscous liquid.

References Cited by the Examiner

UNITED STATES PATENTS

| | | | |
|---|---|---|---|
| 1,688,812 | 10/28 | Huff | 137—8 |
| 2,288,297 | 6/42 | Naiman | 137—8 |
| 2,740,616 | 4/36 | Walden | 259—4 |
| 2,747,844 | 5/56 | Slayter | 259—4 |
| 3,051,453 | 8/62 | Sluijters | 259—4 |

FOREIGN PATENTS 1,226,883   2/60   France.

WALTER A. SCHEEL, *Primary Examiner.*

ISADOR WEIL, LEO QUACKENBUSH, *Examiners.*